(12) United States Patent
Lam et al.

(10) Patent No.: US 10,286,408 B2
(45) Date of Patent: May 14, 2019

(54) CYCLONIC SEPARATOR

(71) Applicant: AIRBUS OPERATIONS LIMITED, Bristol (GB)

(72) Inventors: Joseph K-W Lam, Bristol (GB); Stephen Lisle-Taylor, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 340 days.

(21) Appl. No.: 15/160,486

(22) Filed: May 20, 2016

(65) Prior Publication Data
US 2016/0339453 A1 Nov. 24, 2016

(30) Foreign Application Priority Data

May 21, 2015 (GB) .................................. 1508701.8

(51) Int. Cl.
| | | |
|---|---|---|
| *B01D 17/02* | (2006.01) | |
| *B04C 5/10* | (2006.01) | |
| *B04C 9/00* | (2006.01) | |
| *B64D 37/34* | (2006.01) | |
| *C10G 33/06* | (2006.01) | |

(Continued)

(52) U.S. Cl.
CPC ............ *B04C 9/00* (2013.01); *B01D 17/0217* (2013.01); *B01D 17/085* (2013.01); *B04C 5/08* (2013.01); *B04C 5/10* (2013.01); *B64D 37/34* (2013.01); *C10G 33/06* (2013.01); *F02C 7/22* (2013.01); *B04C 2009/004* (2013.01)

(58) Field of Classification Search
CPC .... B04C 9/00; B04C 5/08; B04C 5/10; B04C 2009/004; B04C 5/103; B04C 11/00; F02C 7/22; B01D 17/085; B01D 17/0217; B01D 17/02; B01D 21/26; B01D 21/262; B01D 21/265; B01D 21/267; C10G 33/06; C10G 31/09; B64D 37/34
USPC ...... 210/172.1, 512.1, 788, 799, 304, 512.2, 210/512.3; 244/135, 135 A, 135 R
See application file for complete search history.

(56) References Cited

U.S. PATENT DOCUMENTS 3,489,680 A 1/1970 Snavely, Jr.
3,776,385 A * 12/1973 Maciula .................... B04C 5/13
209/17

(Continued)

FOREIGN PATENT DOCUMENTS

DE 10 2004041768 A1 * 3/2005 ............. B01D 21/26
WO 2014174247 A1 10/2014

OTHER PUBLICATIONS

Derwent Translation of Published Patent Document DE 10 2004041768A1, Ortiz et al, Published Mar. 31, 2005.*

(Continued)

*Primary Examiner* — Joseph W Drodge
(74) *Attorney, Agent, or Firm* — Nixon & Vanderhye P.C.

(57) ABSTRACT

A cyclonic separator with an inlet, a fuel outlet, an inner wall comprising a water-permeable material, an outer wall, a cavity between the inner wall and the outer wall, and a water outlet. The cyclonic separator is adapted to discharge water from the water outlet via the cavity and relatively less dense liquid fuel from the fuel outlet. The water-permeable material enables water in the cyclonic separator to flow through the water-permeable material into the cavity, but substantially prevents liquid fuel in the cyclonic separator from doing so.

20 Claims, 15 Drawing Sheets

(51) Int. Cl.
*F02C 7/22* (2006.01)
*B01D 17/00* (2006.01)
*B04C 5/08* (2006.01)

(56) References Cited

U.S. PATENT DOCUMENTS

| | | | | |
|---|---|---|---|---|
| 4,081,373 | A * | 3/1978 | Rozniecki | B01D 17/0217 |
| | | | | 210/114 |
| 6,210,575 | B1 | 4/2001 | Chase et al. | |
| 6,440,317 | B1 * | 8/2002 | Koethe | B01D 17/0217 |
| | | | | 210/774 |
| 7,285,209 | B2 * | 10/2007 | Yu | B01D 17/0211 |
| | | | | 210/195.2 |
| 8,221,633 | B2 * | 7/2012 | Lam | B01D 17/0217 |
| | | | | 210/788 |
| 2002/0189807 | A1 | 12/2002 | Emanuele et al. | |
| 2003/0168402 | A1 * | 9/2003 | McKay | B01D 17/00 |
| | | | | 210/512.1 |
| 2007/0039865 | A1 * | 2/2007 | Jiang | B01D 36/003 |
| | | | | 210/259 |
| 2012/0000864 | A1 * | 1/2012 | Lam | B01D 17/0217 |
| | | | | 210/787 |
| 2012/0298593 | A1 | 11/2012 | Buchholz et al. | |
| 2013/0098825 | A1 * | 4/2013 | Kiedaisch | B01D 17/045 |
| | | | | 210/259 |
| 2013/0146536 | A1 | 6/2013 | Tarabara et al. | |
| 2013/0330833 | A1 * | 12/2013 | Ruiz | B01D 39/00 |
| | | | | 436/174 |
| 2014/0081067 | A1 * | 3/2014 | Tour | B01J 20/3204 |
| | | | | 588/13 |
| 2016/0074813 | A1 * | 3/2016 | Sjungargard | B64D 37/00 |
| | | | | 210/651 |

OTHER PUBLICATIONS

"Unimpeded Permeation of Water Through Helium-Leak—Tight Graphene-Based Membranes", R.R Nair et al, Science, Jan. 27, 2012, vol. 335, No. 6067, pp. 442-444, DOI:10.1126/science.1211694.

UKIPO Search Report dated Nov. 20, 2015, Great Britain Application No. 1508701.8.

European Search Report dated Sep. 12, 2016 EP Application No. 16170286.

* cited by examiner

CYCLONIC SEPARATOR

RELATED APPLICATIONS

The present application claims priority from Great Britain Application Number 1508701.8, filed May 21, 2015, the disclosure of which is hereby incorporated by reference herein in its entirety.

FIELD OF THE INVENTION

The present invention relates to a cyclonic separator, and a fuel system including a cyclonic separator.

BACKGROUND OF THE INVENTION

A known cyclonic separator is described in US 2012/0000864. The cyclonic separator has an inlet fluidically connected to a fuel tank, a water outlet fluidically connected to an engine fuel feed system, and a fuel outlet. The cyclonic separator is adapted to discharge relatively denser material (including water) from the water outlet and relatively less dense material from the fuel outlet.

A problem with such a known cyclonic separator is that although the overall cyclonic action spins the water out to the separator wall, the fluid dynamic may shear the water off the wall and entrain it back into the bulk fluid due to turbulence, degrading the efficiency of separation.

"Unimpeded Permeation of Water Through Helium-Leak-Tight Graphene-Based Membranes", R. R Nair et al, Science, 27 Jan. 2012, Vol. 335, no. 6067, pp. 442-444, DOI: 10.1126/science.1211694 (referred to below as "Nair et al") demonstrated that submicrometer-thick membranes made from graphene oxide can be completely impermeable to liquids, vapors, and gases, including helium, but these membranes allow unimpeded permeation of water.

WO2014/174247 describes a tank assembly with a tank for storing liquid hydrocarbon, the tank having a floor for supporting a weight of the liquid hydrocarbon. A filter is fitted to the floor of the tank. The filter is arranged to allow liquid water in the tank to drain out of the tank through the filter but substantially prevent the liquid hydrocarbon in the tank from doing so. The filter has a permeation member, such as a membrane, which is formed from a material such as graphene oxide which allows liquid water in the tank to drain out of the tank by permeating through the permeation member but substantially prevent the liquid hydrocarbon in the tank from doing so.

SUMMARY OF THE INVENTION

A first aspect of the invention provides a cyclonic separator comprising: a separation chamber; an inlet in fluid communication with the separation chamber; a fuel outlet in fluid communication with the separation chamber; and a water outlet, wherein the cyclonic separator is adapted to discharge water from the water outlet and relatively less dense liquid fuel from the fuel outlet, and wherein the cyclonic separator further comprises a permeation member formed from a water-permeable material which enables water in the separation chamber to flow through the water-permeable material and out of the water outlet, but substantially prevents liquid fuel in the separation chamber from doing so.

A second aspect of the invention provides a fuel system comprising: a fuel tank; and a cyclonic separator according to the first aspect with its inlet in fluid communication with the fuel tank.

Cyclonic separators for separating solids from liquids, or to separate (or at least concentrate) liquids of different density are also known as hydrocyclones or hydroclones.

In operation, water naturally occurring in the fuel, and which is denser than the fuel, is separated by the cyclonic separator and optionally fed to an engine to be burnt off. The less dense purified fuel exiting from the fuel outlet of the cyclonic separator is preferably fed back into the fuel tank. By removing water from the tank, rather than merely dispersing condensation back into the tank, the concentration of water in the tank is kept low and problems associated with water condensation within the tank are prevented, even at low temperatures.

Optionally the cyclonic separator comprises a wall which defines the separation chamber, wherein the wall symmetrically extends around a centrally disposed, longitudinal axis; the permeation member forms at least part of the wall; and the permeation member also symmetrically extends around the centrally disposed, longitudinal axis. Alternatively the permeation member may be disposed in an asymmetrical manner—for instance only on one side of the separation chamber, or it may be disposed on the axis.

Typically the separation chamber is defined by a wall comprising the permeation member; the cyclonic separator further comprises an outer wall which surrounds the inner wall, and a cavity between the inner wall and the outer wall; and the water outlet is in fluid communication with the cavity, wherein the cyclonic separator is adapted to discharge water from the water outlet via the cavity and relatively less dense liquid fuel from the fuel outlet, and the permeation member enables water in the separation chamber to flow through the water-permeable material into the cavity, but substantially prevents liquid fuel in the cyclonic separator from doing so.

The inner wall prevents or at least inhibits the fluid dynamic described above in relation US 2012/0000864, so that water is not entrained back into the bulk fluid. Furthermore, the inner wall may enable the diameter of the outer wall to be smaller since the water-permeable material will have a water-separating effect which complements the effect of the cyclonic action.

Optionally an inner surface of the outer wall includes a hydrophobic coating. The coating may be a paint or other coating material.

The water-permeable material may comprise graphene oxide (typically a layered structure of graphene oxide crystallites), a structure with an array of nanoholes, an array of vertically aligned hollow nanotubes such as carbon nanotubes, or any other suitable material which enables water to flow through it but substantially prevents liquid fuel from doing so.

The liquid fuel is typically a liquid hydrocarbon fuel such as gasolene or kerosene.

The water from the water outlet may be fed into an engine feed system. Alternatively the water from the water outlet may be exhausted to atmosphere or a collection vessel.

The fuel system of the second aspect of the invention may be an aircraft fuel system, a fuel system of another vehicle, or any other fuel system with an engine feed system which feeds fuel to an engine. Alternatively the fuel system may be a fuel storage silo or other fuel system with no engine.

Optionally a porous support structure supports the permeation member.

Optionally the inner wall, the outer wall, and the cavity each have a portion with a frusto-conical shape.

Optionally the fuel outlet of the cyclonic separator is in fluid communication with the fuel tank.

In relation to an aircraft fuel system, the lowest temperatures within the tank are encountered during the cruise portion of flight and so the cyclonic separator is preferably operated during the cruise, so as to remove water when condensation would otherwise most likely occur. Although the cyclonic separator is preferably operated during the cruise, it may be operated during any phase of the flight (taxi, take-off, cruise or land). For example, water may be induced from a fuel tank sump into an induction line by a jet pump during the early phase of the flight (taxi and take-off) and discharged with motive flow to the cyclonic separator.

The inlet of the cyclonic separator is preferably connected to a fuel feed line adapted to entrain a mixture of fuel and water or ice from a region of the fuel tank in which water or ice, preferably still in suspension, tends to collect. When fuel flows in the fuel feed line, the mixture becomes entrained into the flow. The feed line may include a porous surface through which the mixture flows to become entrained in the fuel flow. The porous surface may be a grid, mesh or a series of perforations in a wall of the fuel feed line.

The fuel feed line is preferably connected to a fuel pump or forms part of a pressurised system for delivering fuel. The pump may be a jet pump or the like.

The engine fuel feed system is preferably adapted to entrain fuel from the fuel tank. To reduce the concentration of water being fed to the engine, the water from the water outlet may be mixed with fuel from the tank before being fed to the engine. The concentration of water fed to the engine may be controlled so it does not exceed the recommended limit by the engine manufacturers.

The cyclonic separator may be retrofitted to an existing fuel system.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
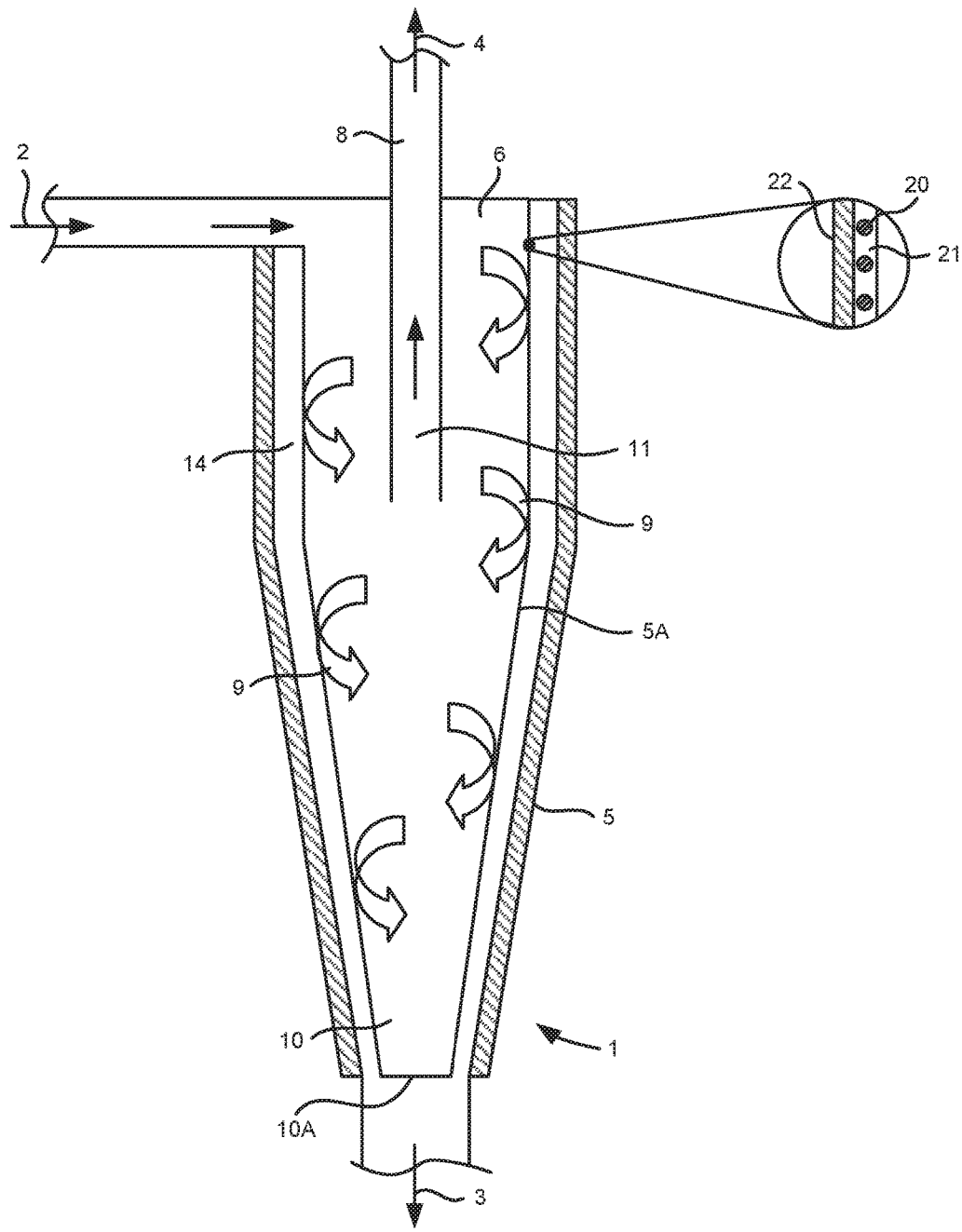
FIG. 1 illustrates schematically a cyclonic separator.

FIG. 1 illustrates schematically a cyclonic separator 1 having an inlet 2, a water outlet 3 and a fuel outlet 4. The cyclonic separator 1 has a cylindrical upper portion and a conical lower portion. The conical lower portion has a conical outer wall 5 having a downwardly narrowing, frusto-conical shape that symmetrically extends around a centrally disposed, longitudinal axis. An upper end 6 of the cyclonic separator 1 has a larger diameter and is disposed above a lower end 7 of the cyclonic separator 1 having a smaller diameter. The inlet 2 is disposed adjacent the upper end 6 and the water outlet 3 is disposed adjacent the lower end 7. A pipe 8 extends into the upper portion of the cyclonic separator 1 and is fluidically connected to the fuel outlet 4.

Figure 2A:
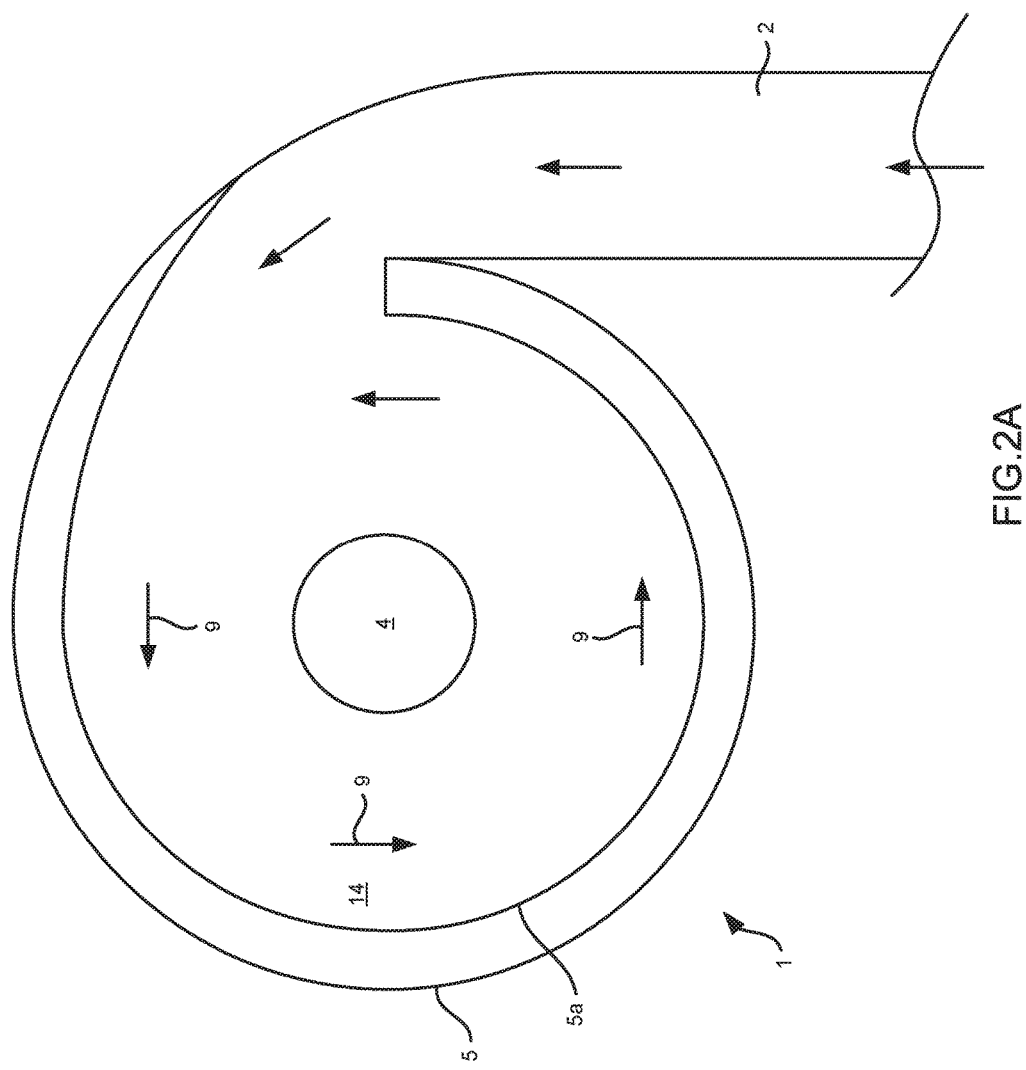
FIG. 2a illustrates schematically a top view of the cyclonic separator.
Figure 2B:
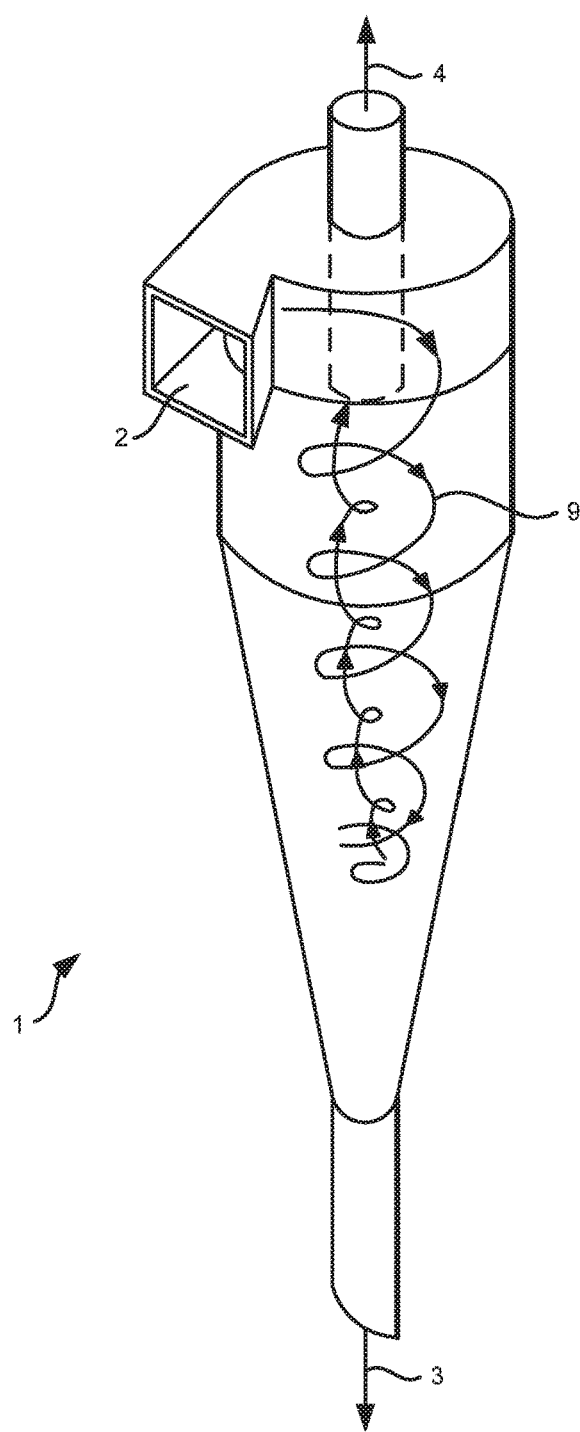
FIG. 2b illustrates schematically a 3D view of the flow within the cyclonic separator during operation.

FIG. 2a illustrates schematically a top view of the cyclonic separator 1 to show the arrangement of the inlet 2 to the upper end 6 of the cyclonic separator 1. FIG. 2b illustrates the three-dimensional flow within the cyclonic separator 1 during operation.

An inner wall 5a is fitted inside the outer wall 5. Like the outer wall 5, the inner wall 5a has a cylindrical upper portion and a conical lower portion with a downwardly narrowing, frusto-conical shape that symmetrically extends around the centrally disposed, longitudinal axis. The interior of the inner wall defines a separation chamber, and a cavity 14 (shown most clearly in FIG. 2a) is provided between the inner wall 5a and the outer wall 5. The nested arrangement of the inner and outer walls means that, like the inner and outer walls, the cavity 14 also has a cylindrical upper portion and a conical lower portion with a downwardly narrowing, frusto-conical shape that symmetrically extends around the centrally disposed, longitudinal axis.

Figure 1A:
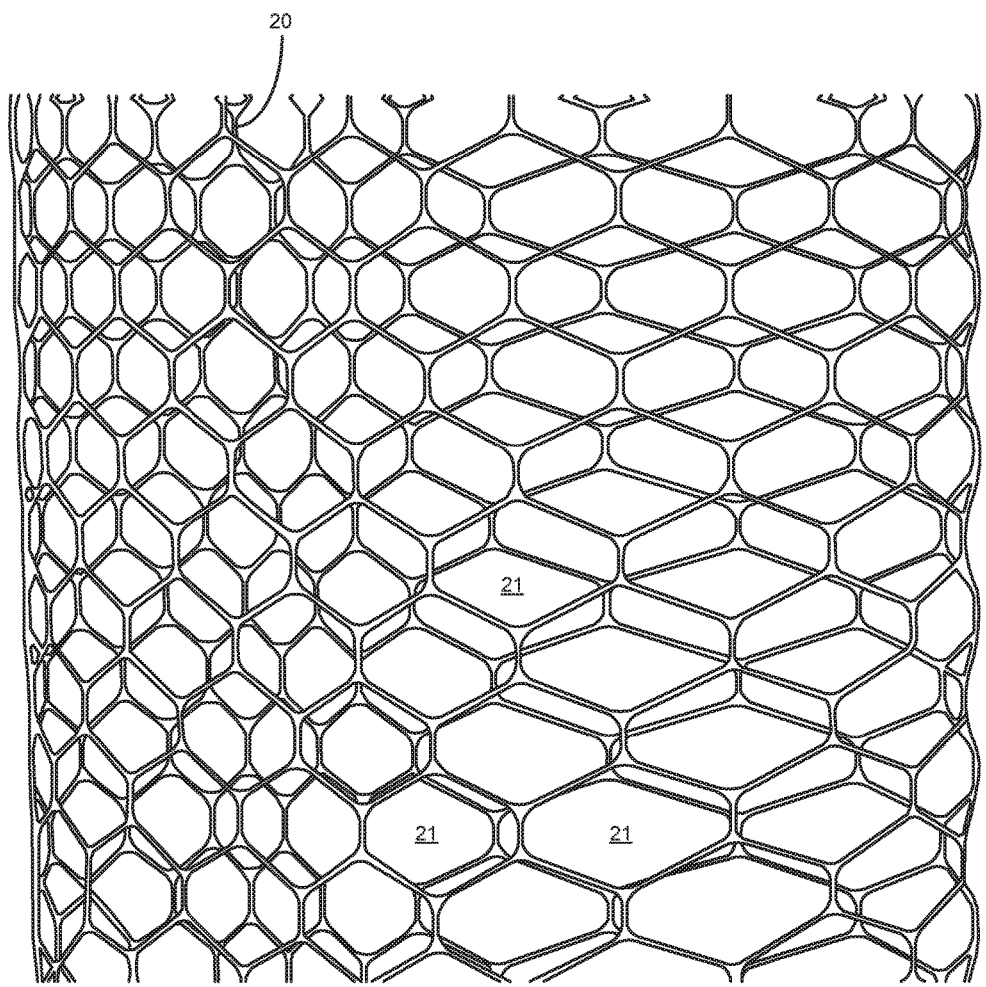
FIG. 1a shows part of the support structure of the inner wall of the cyclonic separator.

The inner wall 5a comprises a porous honeycomb support structure 20 (shown schematically in FIG. 1a) with pores 21, and a permeation member (in this case a permeation layer 22) formed from a water-permeable filter material. The permeation layer 22 is carried by the support structure 20 as shown in the enlarged portion of FIG. 1. Optionally the layer 22 is bonded to the support structure 20, for instance by an adhesive. The layer 22 may be fitted to the inside of the support structure 20 as shown in FIG. 1, or on the outside. Alternatively, the layer 22 may be sandwiched between a pair of porous honeycomb support structures. The permeation layer 22 extends symmetrically around the centrally disposed, longitudinal axis.

Liquid passing through the inlet 2 is introduced tangentially into the cylindrical upper portion of the separation chamber and flows downwardly in a spiral path 9 (see FIGS. 1 and 2b) through the conical lower portion which tapers, or narrows, as it extends downwardly towards a lower portion 10 of the separation chamber. The lower portion 10 of the separation chamber is closed by a removable (screw-in) plug 10a.

The flow is forced into the spiral path 9 due to the tangential entry and the cylindrical/conical shape of the lower portion of the inner wall 5a. The rotational (spiral) flow generates high centrifugal G-forces such that denser materials suspended in the liquid will move to the outermost circumference within the cross sectional area of the conical lower portion of the separator, leaving less dense material in the core of the spiral flow.

As the cross sectional area of the separation chamber decreases toward the bottom of the separator, excess flow is forced upward in a tight inner (core) spiral (see FIG. 2b). An inlet 11 to the pipe 8 is disposed such that relatively less dense material is discharged from the fuel outlet 4.

The general flow direction of the main spiral flow 9 through the cyclonic separator 1 and the geometry of the conical housing 5, 5a cause the relatively denser molecules, ice and particulate material to collect in the lower region 10 of the separation chamber.

The water-permeable permeation layer 22 enables water to flow through it into the cavity 14 via the pores 21 in the support structure and then be discharged from the water outlet 3, but substantially prevents liquid fuel, ice or particulate material from doing so. Thus the water outlet 3 is indirectly in fluid communication with the separation chamber via the permeation layer 22 and the cavity 14. The inlet 2 and fuel outlet 4, on the other hand, are in direct fluid communication with the separation chamber.

The water-permeable material forming the permeation layer 22 may comprise graphene oxide (typically a layered structure of graphene oxide crystallites), a structure with an array of nanoholes, an array of vertically aligned hollow nanotubes such as carbon nanotubes, or any other suitable material which enables water to flow through it but substantially prevents liquid fuel, ice or particulate material from doing so.

FIG. 1b is a schematic view of the water-permeable material 22 according to one embodiment. The material comprises a layered structure of graphene oxide crystallites manufactured by the process described in Nair et al.

Although FIG. 1 shows the cyclonic separator 1 oriented vertically, it will be appreciated by those skilled in the art that the cyclonic separator 1 may be oriented non-vertically if space requirements do not permit a vertical orientation.

In operation, the cyclonic separator is used in a fuel system to separate or at least concentrate quantities of suspended water, ice and particulate material from within fuel. A high volumetric fuel flow is forced into the inlet 2 of the cyclonic separator 1. The flow in the inlet 2 is perpendicular to the central axis of the conical portions of the walls 5, 5a. Centrifugal force will cause the more dense ice, water and particulate material to move to the outer peripheral proportion of the separation chamber, and against the inner surface of the inner wall 5a as the flow travels along the spiral path 9. Less dense, purified fuel will pass within the central region and into the inlet 11 of the pipe 8. The pipe 8 passes the purified fuel to the fuel outlet 4.

The water flows through the water-permeable material of the permeation layer 22 and out of the water outlet 3 via the cavity 14. The ice and particulate material will collect in the lower portion 10 of the separation chamber. When the ice melts, then it will flow through the permeation layer 22 into the cavity 14 and out of the water outlet 3. The particulate material can be removed periodically by removing the plug 10a (for instance by screwing it out of a threaded connection) and flushing it out the separation chamber.

The main driver of the flow through the cyclonic separator 1 is from the high volume flow rate flow entering the inlet 2. The water outlet 3 may discharge to a relatively low static pressure region which provides some effect drawing flow through the cyclonic separator. Nevertheless, this effect is only secondary. The outflow from the fuel outlet 4 is driven by the flow in the cyclonic separator 1. The diameter of the water outlet 3 and the fuel outlet 4 are sized such that the cyclonic separator 1 gives desirable operational characteristics. The diameter of the fuel outlet 4 may be greater than, less than, or equal to the diameter of the water outlet 3. The outflow of the fuel outlet 4 may be connected to a suction device or system, to optimise the outflow characteristic.

The cyclonic separator 1 has two lines of defence to prevent ice sticking on the inner surface of the outer wall 5. The primary defence is a hydrophobic and/or ice-phobic coating on the inner surface of the outer wall 5. The secondary defence is heating of the inner surfaces of the outer wall by heat exchangers (not shown). The heat applied is optimised such that any ice particles on the inner surfaces of the outer wall 5 would be melted at the contact point. It should be noted that it is not intended to melt the suspended ice particles in the spiral flow 9. Water is prevented or discouraged from sticking to the inner surfaces of the outer wall by the hydrophobic coating.

Figure 3:
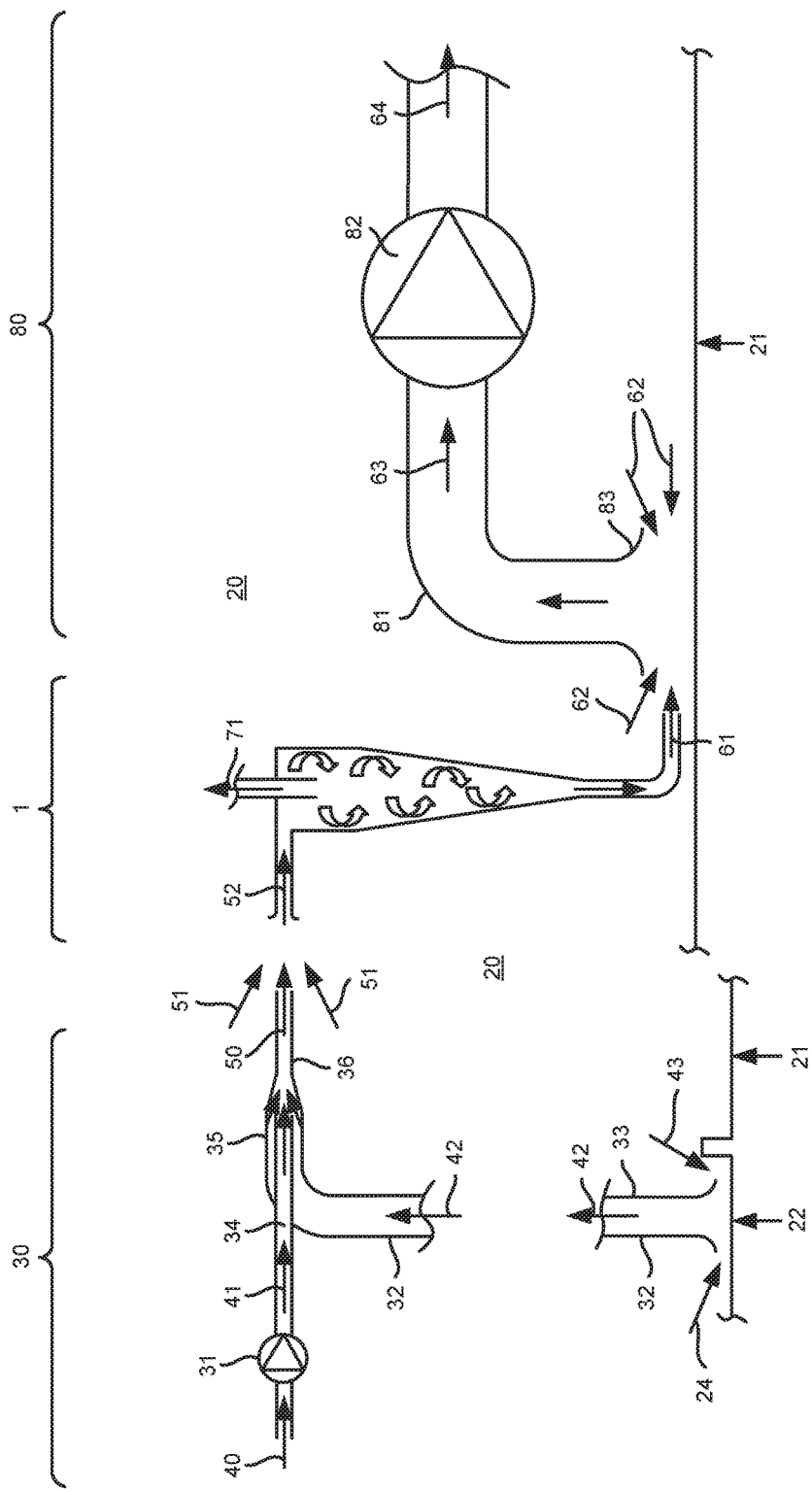
FIG. 3 illustrates schematically a fuel system incorporating the cyclonic separator of FIG. 1.

FIG. 3 shows the cyclonic separator 1 installed in a fuel system. Note that for the purposes of clarity the inner wall 5a of the separator is omitted from FIG. 3. The fuel system includes the cyclonic separator 1, a fuel tank 20 having a floor 21, and an engine (not shown in FIG. 3) which consumes the fuel. Flow 52 to the inlet 2 of the cyclonic separator is delivered by a water scavenge jet pump system 30. The fuel outlet 4 of the cyclonic separator 1 returns a flow 71 of purified fuel to an optimized region (typically an upper region) of the fuel tank 20. The water flow 61 discharged from the water outlet 3 of the cyclonic separator 1 is fed to the engine by an engine feed system 80.

The water scavenge jet pump system 30 will now be described in greater detail below. The water scavenge jet pump system 30 includes a motive flow line 34 having a pump 31, an induced flow line 32, a jet pump 35, and a mixed flow line 36. The pump 31 draws a flow 40 from the tank 20 and delivers a flow 41 under pressure in the motive flow line 34 to the jet pump 35. The induced flow line 32 delivers a flow 42 from a sump 22 of the fuel tank 20 to the jet pump 35. The jet pump 35 mixes the flows from the motive flow line 34 and the induced flow line 32 and discharges a mixed flow 50 in the mixed flow line 36.

The fuel tank sump 22 is an integral part of the tank 20. It is located at the lowest point of the tank 20. Any free water in the tank, over a period of time, will run down as a flow 24 of water and be collected in the sump 22. The induced flow line 32 has a bell-mouth inlet 33 disposed adjacent the sump 22.

At the start of operation of the water scavenge jet pump system 30, there may be a finite volume of water collected in the sump 22. The motive flow 41 induces the flow 42 in the induced flow line 32. Any free water in the sump 22 would be picked up by entrainment in flow 43 entering the bell-mouth inlet 33 from the tank 20. The jet pump 35 atomizes the water into small droplets in the flow 50. The mixed flow 50 is delivered to the cyclonic separator inlet 2 by a flow arrangement to be described in greater detail with reference to FIG. 4 below. When all the free water in the sump 22 has been consumed, the induced flow line 32 will induce fuel from the tank 20 since the sump is an integral part of the tank.

Figure 4:
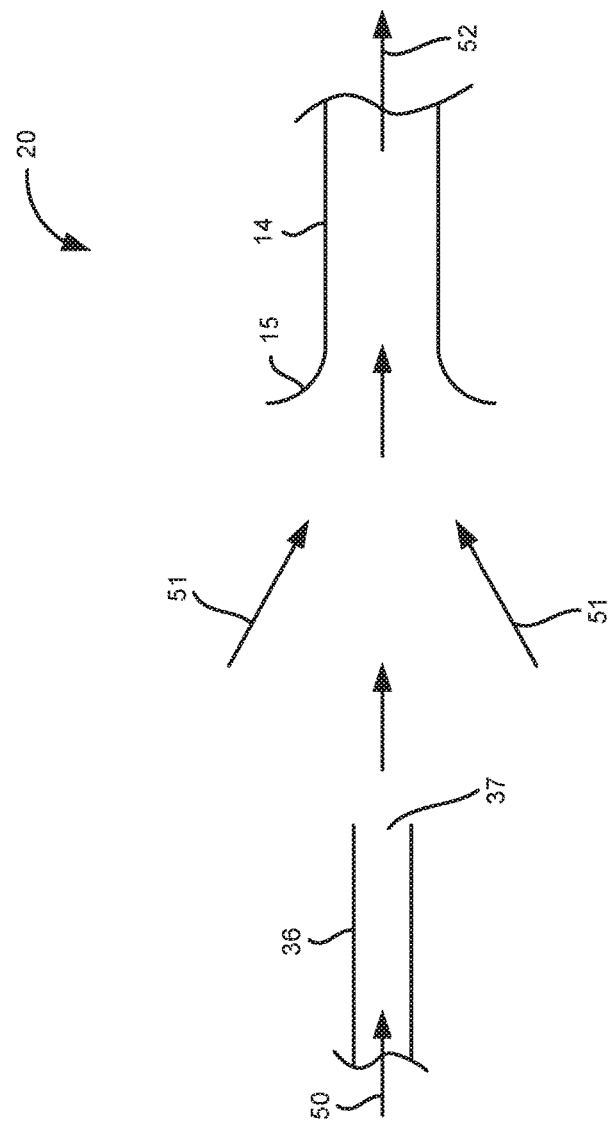
FIG. 4 illustrates schematically detail of the flow arrangement upstream of the inlet of the cyclonic separator in the fuel system of FIG. 3.

Referring to FIG. 4, there is shown schematically detail of the flow arrangement just upstream of the inlet 2 of the cyclonic separator 1 in the fuel system of FIG. 3. The mixed flow line 36 carries the high volumetric mixed flow 50. The cyclonic separator inlet 2 has a flow line 14 having a bell-mouth shaped inlet 15 separated from an outlet 37 of the mixed flow line 36. The flow 50 in the mixed flow line 36 entrains flow 51 of fuel and any water suspended therein from within the fuel tank 20 as it passes between the outlet 37 of the mixed flow line 36 and the inlet 15 of the flow line 14.

The flow lines 36 and 14 are preferably disposed near the bottom of the tank 20, primarily because the engine feed system 80 is mounted at the bottom of the tank. Additionally, since the cyclonic separator 1 is designed to return the purified fuel flow 4 to an upper region of the tank, over a period of operation the cyclonic separator 1 will create a suspended water concentration stratification such that the higher concentration is found near the bottom of the tank. Therefore, by disposing the flow lines 36 and 14 near the bottom of the tank, fuel having the higher concentration of water in suspension is entrained the into the flow 52 in the flow line 14, such that the system can benefit from this stratification and operate at optimal conditions. However, it will be appreciated by those skilled in the art that the flow lines 36, 14 need not be provided at the bottom of the tank.

The flow 52 of fuel and water, and any ice or other particulate material, is fed under pressure of the jet pump 35 from flow line 36 into the inlet 2 of the cyclonic separator 1.

Figure 5:
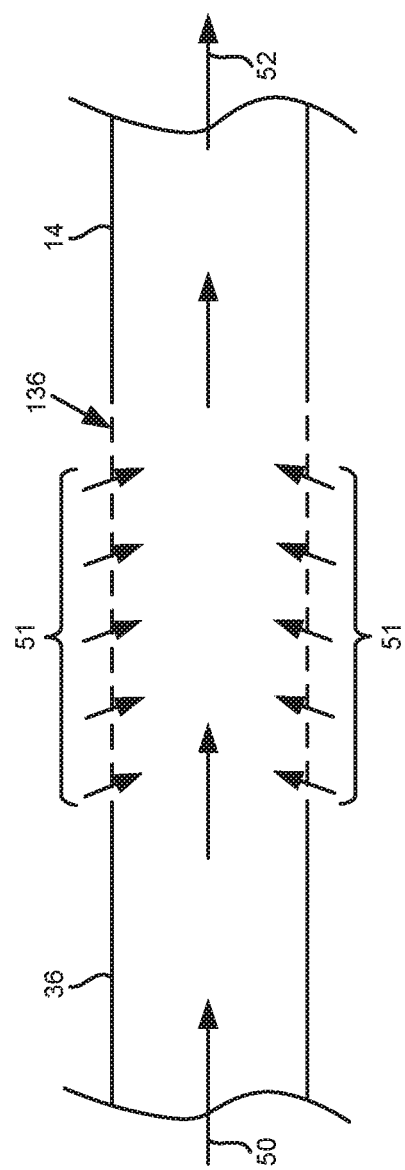
FIG. 5 illustrates schematically an alternative flow arrangement upstream of the inlet of the cyclonic separator to replace that shown in FIG. 4 in the fuel system of FIG. 3.

Referring now to FIG. 5, there is shown schematically a second, alternative flow arrangement just upstream of the inlet 2 of the cyclonic separator 1 which may replace the flow arrangement shown in FIG. 4. In the second, alternative flow arrangement the flow lines 36 and 14 are connected by a porous flow line 136 carrying the high volumetric mixed flow 50 of fuel which may contain some suspended water, ice or other particulate material from the water scavenge jet pump system 30. As the flow 50 passes through the porous flow line 136 it entrains the flow 51 of fuel and any water suspended therein from within the tank 20. The porous flow line has a porous wall which may include a series of perforations or may be a mesh, or the like. The resultant flow 52, is discharged to the inlet 2 of the cyclonic separator 1. The porous flow line 136 is preferably disposed near the bottom of the fuel tank 20 for the same reasons outlined for the arrangement depicted in FIG. 4.

Returning to FIG. 3, the water outlet 3 of the cyclonic separator 1 discharges a flow 61 of water. The purified fuel exiting the cyclonic separator 1 via the fuel outlet 4 is fed back into the fuel tank, preferably to an upper region of the fuel tank. In this way, the fuel recirculated back into the fuel tank has a significantly lower concentration of water, ice or particulate material than the fuel entering the inlet 2 of the cyclonic separator 1 from the fuel tank.

The engine feed system 80 will now be described in greater detail below. The engine feed system 80 includes an engine feed line 81 and an engine feed pump 82. The engine feed line 81 has a bell-mouth inlet 83 which is disposed adjacent the tank floor 21. The inlet 83 has a mesh (not shown) across its mouth for filtering out larger particulate matter entering the engine feed line 81. Additional filtering means may be provided elsewhere in the engine feed system 80 for filtering out finer particulate matter. The engine feed pump 82 directs a flow 64 of fuel to the engine of the fuel system. When the engine feed pump 82 is operated, a flow 62 of fuel is drawn from the tank 20 into the engine feed line 81 via the inlet 83. The inlet 83 is disposed near the bottom of the tank to minimise the unusable fuel in the tank. The concentration of suspended water will tend to be higher due to the flow 61 from the water outlet 3 of the cyclonic separator 1. During operation, the water flow 61 discharged from the water outlet 3 of the cyclonic separator 1 is entrained into the flow in the engine feed line 81, indicated by flow line 63.

Figure 6:
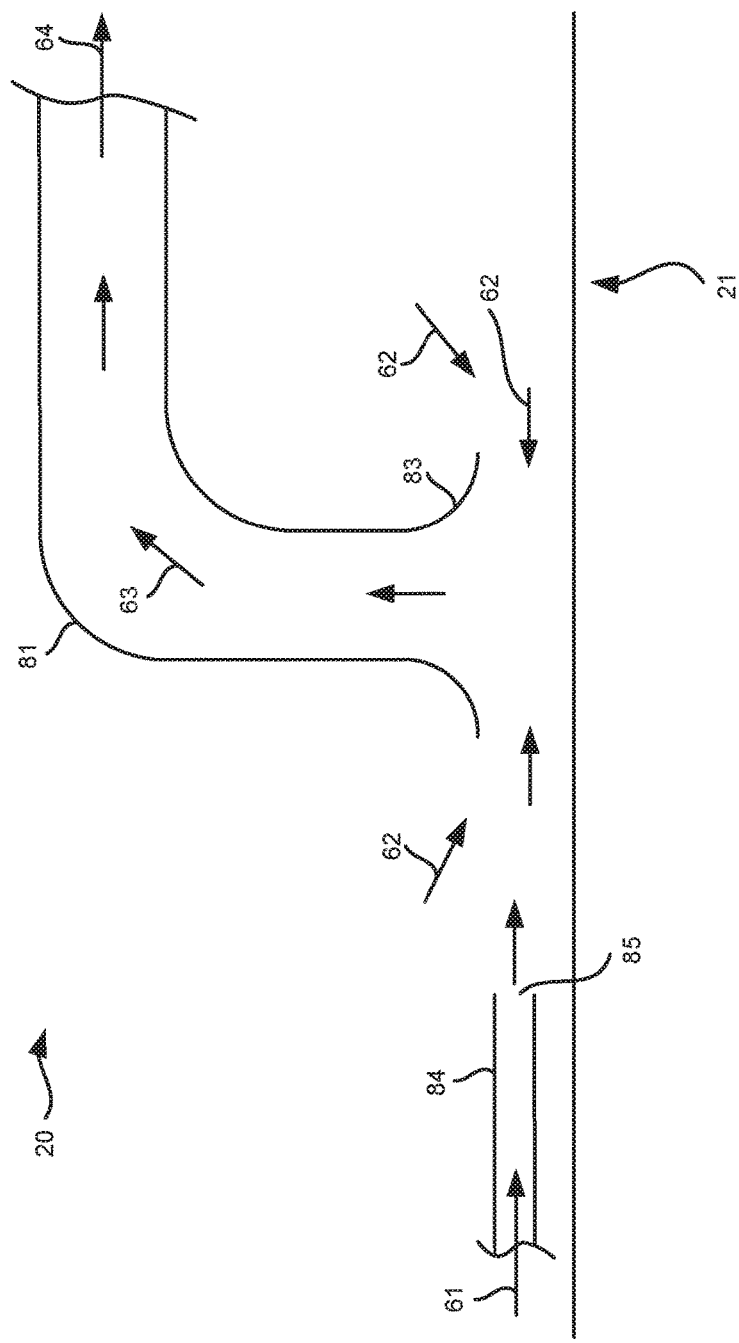
FIG. 6 illustrates schematically detail of the flow arrangement downstream of the water outlet of the cyclonic separator in the fuel system of FIG. 3.

Referring to FIG. 6, there is shown schematically detail of the flow arrangement just downstream of the water outlet 3 of the cyclonic separator 1 of the fuel system of FIG. 3. The water flow 61 flowing from the water outlet 3 of the cyclonic separator 1 flows in discharge line 84. Discharge line 84 has an outlet 85 positioned adjacent the tank floor 21 and adjacent the inlet 83 of the engine feed line 81. The water flow 61 is entrained into the fuel flow 62 drawn into the inlet of engine feed line 81 when the engine feed pump 82 is operated.

It is important that the concentration of water in the engine feed line 81 is controlled such that it does not exceed the limit recommended by the engine manufacturer. The concentration of water in the flow 63 in the engine feed line 81 may be controlled by a suitable valve or other fuel control device. The engine consumes the water in the fuel fed to it such that water is removed from the fuel tank 20 during operation.

Figure 7:
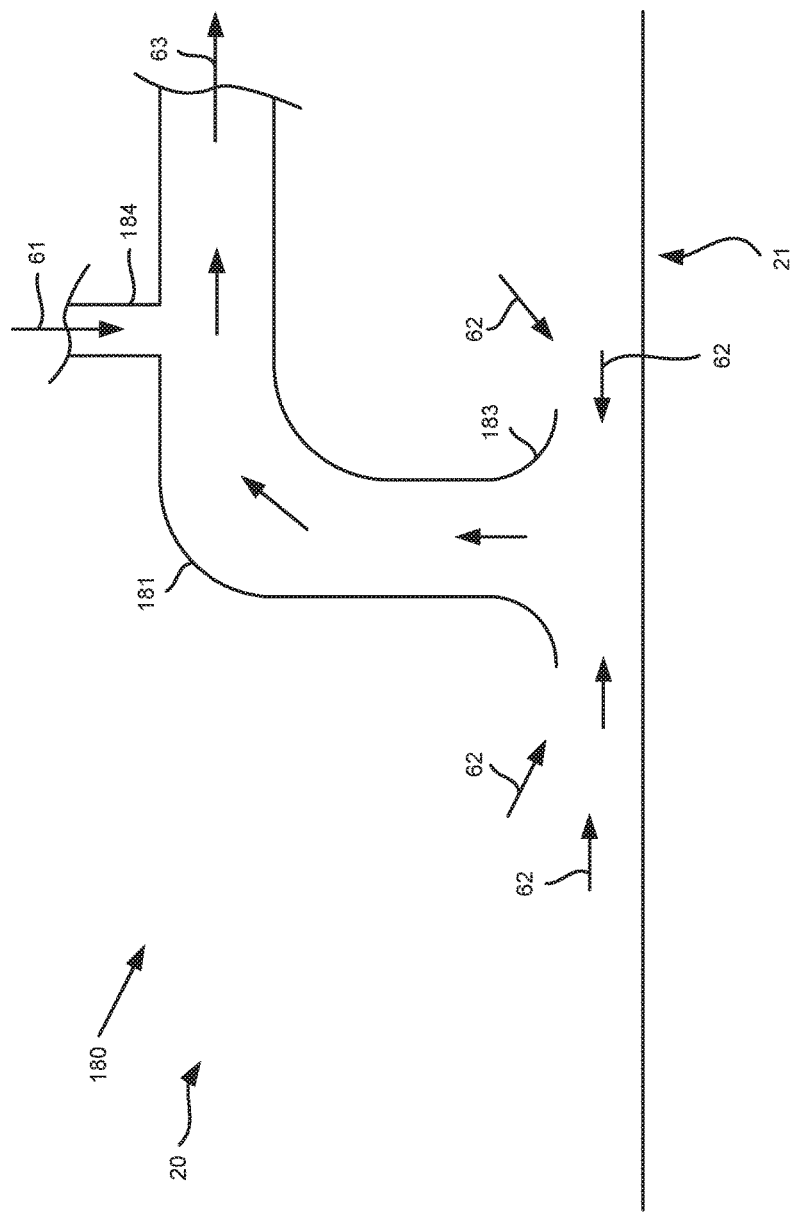
FIG. 7 illustrates schematically an alternative flow arrangement downstream of the water outlet of the cyclonic separator to replace that shown in FIG. 6 in the fuel system of FIG. 3.

A second, alternative flow arrangement in the engine feed system downstream of the water outlet 3 of the cyclonic separator 1 is shown schematically in FIG. 7. The engine feed system 180 is identical to the engine feed system 80 with the exception that the water flow 61 flowing from the water outlet 3 of the cyclonic separator 1 flows directly into the engine feed line. The water rich fuel flow 61 flows in discharge line 184, which is fluidically connected to the engine feed line 181 between its bell-mouth inlet 183 and the engine feed pump (not shown in FIG. 7). Flow 62 of fuel from the tank floor 21 is drawn into the engine feed line 181 at the inlet 183 when the engine feed pump is operational. The flow 61 is entrained into the flow 62 in the engine feed line 181 to form flow 63 which is pumped by the engine feed pump to the engine further downstream. The engine consumes the fuel and water in the flow 63. The concentration of water in the fuel flow 63 may be controlled by a suitable valve or other fuel management device in a similar manner to the flow arrangement depicted in FIG. 6.

Figure 8:
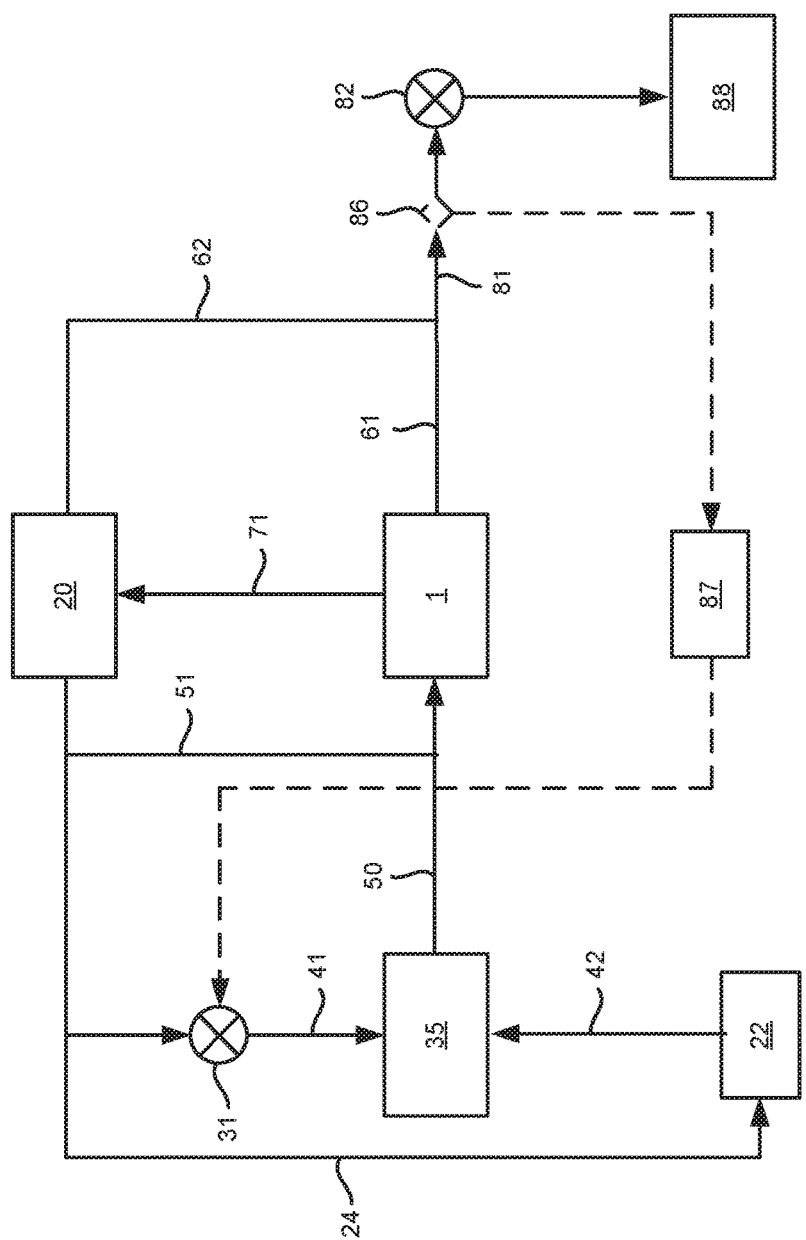
FIG. 8 illustrates a block diagram of the general arrangement of the fuel system of FIG. 3.

FIG. 8 is a block diagram of the general arrangement of the fuel system shown in FIG. 3. Flow paths and flow components are shown in solid line and control links and control components are shown in broken line. The flow paths and flow components are described above with respect to FIG. 3. The fuel system further includes a sensor 86 in the engine feed line 81 (or 181) to detect the concentration of suspended water in the flow 63 in the engine feed line 81 to the engine 88. A signal from the sensor 86 is processed in a controller 87 to control the pump 31 that delivers the motive flow 41 in the jet pump 35.

By controlling the pump 31, the motive flow 41 and ultimately be mixed flow 50 may be varied. The flow delivered to the cyclonic separator 1 has two effects on the operational characteristics of the cyclonic separator 1. With a lower flow rate to the inlet 2, it would generate a lower rotational (angular) rate and thereby create a lower G-force (centrifugal force) such that it is less efficient to separate dense materials out in the cyclonic separator 1. In addition, with a lower flow rate, the throughput flow through the cyclonic separator 1 is reduced such that there is less flow out at both the water outlet 3 and the fuel outlet 4 of the cyclonic separator 1. In this way, the concentration of suspended water in the flow 63 to the engine 88 can be controlled.

In addition, controlling the pump 31 controls the mix of induced flow 42 and motive flow 41 in the jet pump 35, which can be used to vary the concentration of water in the mixed flow 50 fed to the cyclonic separator 1. During the early phase of a flight, the induced flow line 32 will be inducing water from the sump 22 and so controlling the pump 31 will be the primary control of the water concentration in the mixed flow 50. When the water in the sump 22 is consumed and the induced flow line 32 is inducing fuel flow from the tank 20, then the water concentration of the mixed flow 50 does not change with varying motive flow 41 since the water concentration in the motive flow would be the same as that in the induced flow 42.

Figure 9:
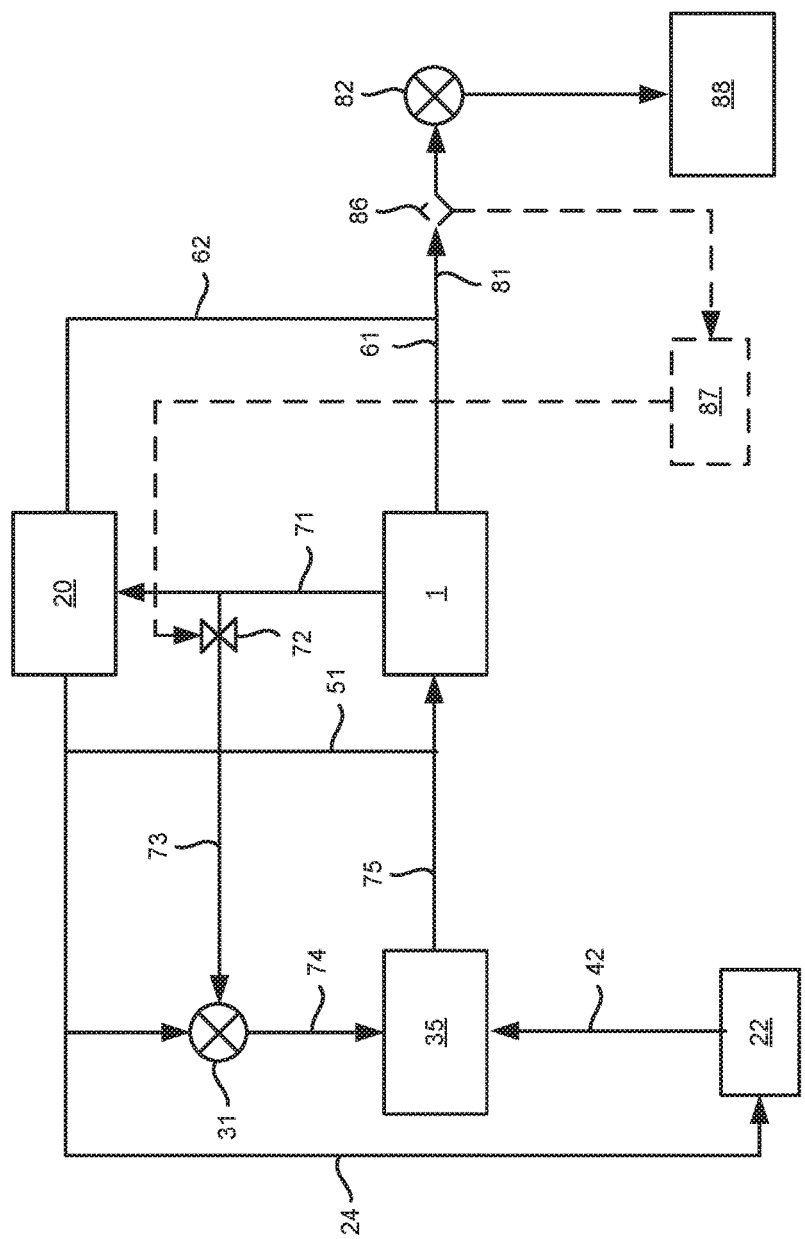
FIG. 9 illustrates a block diagram of the general arrangement of the fuel system of FIG. 3 and having an alternative control philosophy to that shown in FIG. 8.

FIG. 9 is a block diagram of the general arrangement of the fuel system shown in FIG. 3 having an alternative control philosophy to that shown in FIG. 8. Flow paths and flow components are shown in solid line and control links and control components are shown in broken line. The only difference between the fuel system of FIG. 8 and that of FIG. 9 is that the fuel system of FIG. 9 further includes a valve 72 disposed downstream of the fuel outlet 4 of the cyclonic separator 1 to divert some of the flow 71 to the pump 31 along a purified flow line 73. The valve 72 is controlled by the controller 87 based upon the signal from the sensor 86 to divert an appropriate amount of purified fuel in the flow 71 to the pump 31 to be entrained into a motive flow 74 fed to the jet pump 35. The jet pump 35 discharges a mixed flow 75 to the inlet 2 of the cyclonic separator 1.

In this case, the controller 87 does not affect the flow rate delivered to the inlet 2 of the cyclonic separator 1. The operational characteristics (i.e. throughput and G-force) of the cyclonic separator 1 are therefore unchanged by the controller 87. By controlling the flow 73 of purified fuel to the pump 31, the concentration of water in the motive flow 74 and ultimately the mixed flow 75 may be varied. A higher purified fuel flow rate to the pump 31 reduces the concentration of suspended water in the mixed flow 75, and vice versa. In this way, the concentration of suspended water in the flow 63 to the engine 88 can be controlled.

Figure 10:
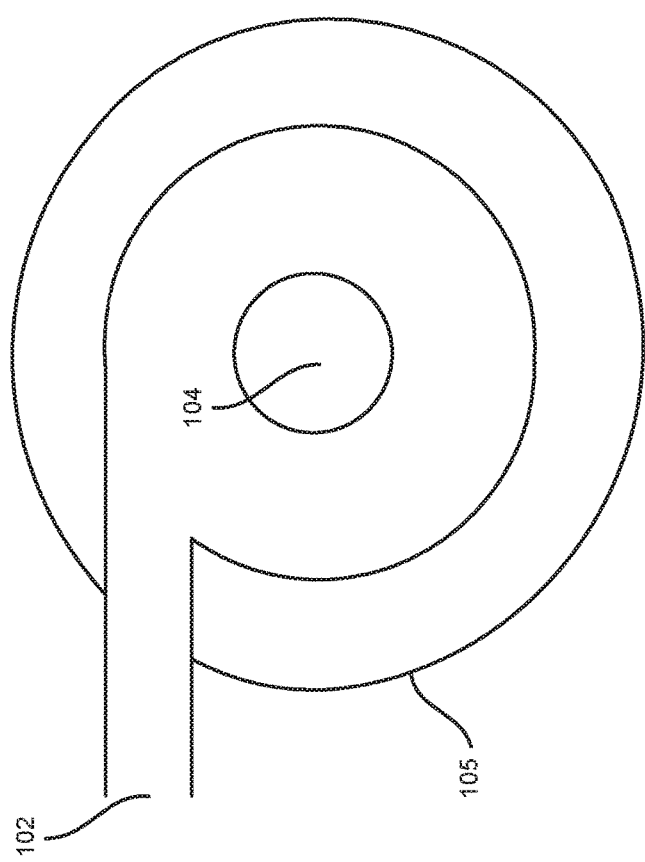
FIG. 10 illustrates schematically a top view of a cyclonic separator according to a further embodiment of the invention.
Figure 11:
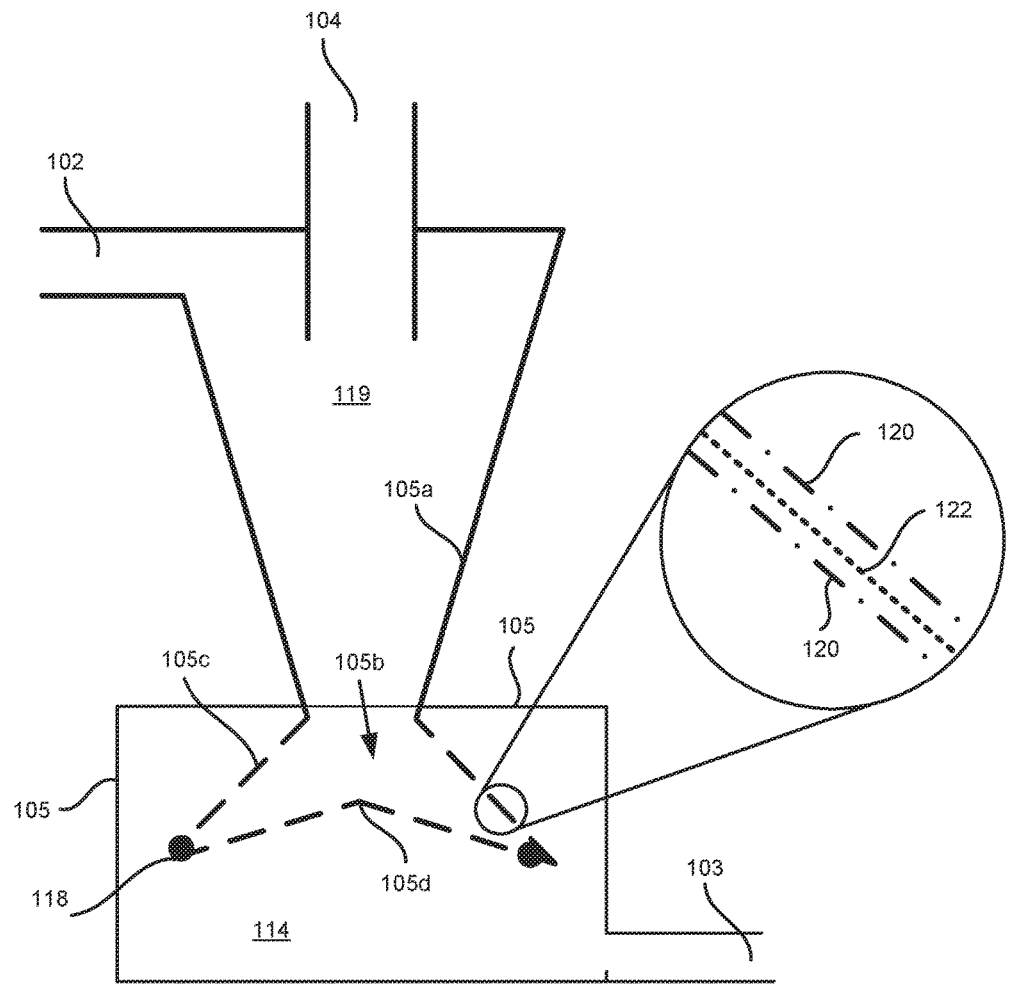
FIG. 11 is a side view of the cyclonic separator of FIG. 10.
Figure 12:
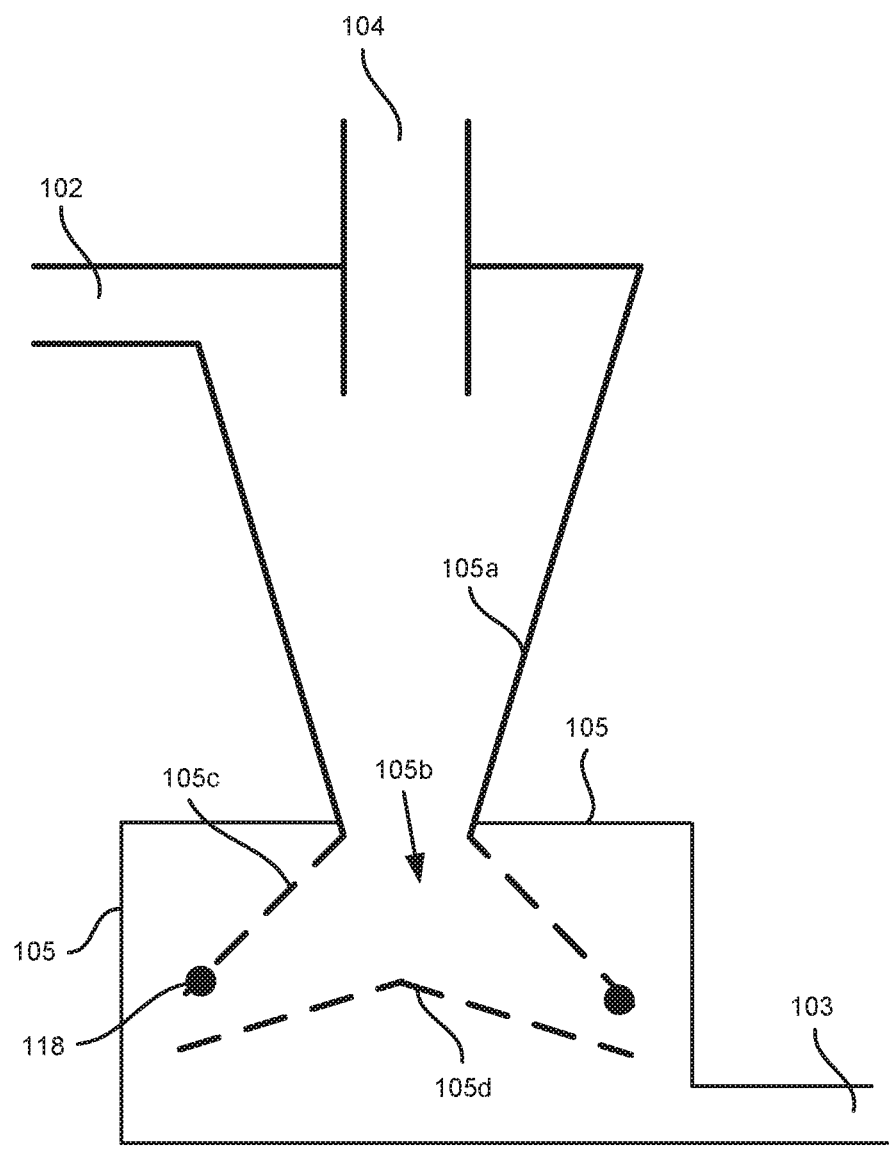
FIG. 12 shows the cyclonic separator of FIGS. 10 and 11 with its cap in an open position.

Other possible arrangements of the fuel system are described in FIGS. 10-12 of US2012/0000864—the contents of which are incorporated herein by reference and will not be described in further detail here.

An existing fuel system comprising a fuel tank, an engine, an engine feed pump and an engine feed line may be modified to accommodate the present invention as set out below. One or more of the cyclonic separators needs to be fluidically connected between the fuel tank and the engine feed line, with the water outlet discharging towards the engine feed line and the fuel outlet discharging back to the fuel tank.

An aircraft fuel system may consist of multiple tanks connected by a network of pipes and have one or more engine feed systems. The engine feed systems may be for powering one or more engines for propulsion and/or for aircraft equipments/systems. The term "engine" is referred to any device that consumes fuel, i.e. internal combustion engine, gas turbine, fuel cell, etc.

At least one cyclonic separator would be used for each engine feed system. In some cases, more cyclonic separators would be used to meet the fuel demand by the engine feed system. These would in general be arranged in parallel. However, the cyclonic separators may alternatively be arranged in a cascade (series) to improve the separation efficiency, with the water outlet of the upstream cyclonic separator discharging to the inlet of the downstream cyclonic separator.

In addition, cyclonic separators may be used to reduce the water concentration in one tank at the expense of increasing the water concentration in another tank. This strategy may be used to confine the water in a limited number (e.g. one or two) of tanks where access to drain the water through water drain valves in the sump may be more accessible than in other tanks.

The fuel in the tank that is fed to the cyclonic separator may include some suspended water droplets. Additionally, fuel from the tank may be mixed with water scavenged from pools at the bottom of the tank which is dispersed in the fuel by a jet pump, or the like, before being fed to the cyclonic separator. The existing fuel system may already include a water scavenge jet pump system, or such a system may be installed at the time of installation of the cyclonic separator. The fuel system may be arranged as shown in FIG. 8 or 9, for example. Alternatively, the fuel system may have no water scavenge jet pump system such that the cyclonic separator is arranged in a pressurised fuel system. In either case, fuel is fed from the tank to the inlet of the cyclonic separator.

The water outlet of the cyclonic separator discharges water in the direction of the engine feed line to be taken up by the engine feed pump and fed to the engine. The fluid connection between the water outlet of the cyclonic separator may be arranged as shown in FIG. 3 (detail in FIG. 6) or as shown in FIG. 7, for example.

A control system for controlling the flow fed to the inlet of the cyclonic separator is installed in the fuel system. The control system may, for example, be as shown in FIG. 8 or 9. The control system in these arrangements includes a sensor in the engine feed line and a controller which controls the fuel flow upstream of the inlet to the cyclonic separator in dependence on the sensor output signal.

The fuel outlet of the cyclonic separator is connected so as to discharge purified fuel to the tank (as shown in the arrangements of FIGS. 8 and 9), and possibly also to the jet pump or pressurised fuel system upstream of the inlet of the cyclonic separator.

It will be appreciated that other flow arrangements may similarly be used. Importantly, a high volumetric flow of fuel having a relatively high concentration of water must be drawn from the fuel tank via a pressurised system or a jet pump, or the like, and fed to the inlet of the cyclonic separator.

Suitable filtering means may be provided upstream of the cyclonic separator to filter out larger particulate matter before the flow enters the cyclonic separator. Such filters may need to be periodically cleaned or replaced. The cyclonic separator acts to prevent recirculation of any remaining particulate matter around the fuel tank, as particulate matter will accumulate in the lower portion 10 of the separation chamber of the cyclonic separator rather than being discharged from the fuel outlet 4.

The fuel system including the fuel tank, cyclonic separator, engine and various feed lines may be an aircraft fuel system. However, the fuel system may be in virtually any land or water based vehicle such as a boat, or a lorry.

In the embodiments of the invention described above, the water outlet 3 is in fluid communication with an engine feed system so that water from the separator is fed into the engine. In an alternative embodiment (not shown), rather than feeding water from the separator directly into the engine feed system, the water outlet 3 may lead to a water sump at a low point of the fuel tank. The water sump contains a drain valve which is periodically opened to drain water out of the water sump. Such an arrangement may be employed on a vehicle (such as an aircraft) or in a fuel storage silo for example.

FIGS. 10-12 illustrate schematically a cyclonic separator according to another embodiment of the invention. Water-permeable parts are shown in dashed lines. The separator has an inlet 102, a water outlet 103 and a fuel outlet 104 which are all in fluid communication with a separation chamber 119 either directly (in the case of the inlet 102 and fuel outlet 104) or indirectly (in the case of the water outlet 103). An upper portion of the cyclonic separator has a conical wall 105a which defines a separation chamber 119 with a downwardly narrowing, frusto-conical shape that symmetrically extends around a centrally disposed, longitudinal axis. The bottom of the separation chamber is closed by a lower portion 105b of the cyclonic separator. The lower portion 105b comprises a wall 105c and a cap 105d which each have a downwardly widening, frusto-conical shape that symmetrically extends around the longitudinal axis.

A cylindrical water collection housing 105 is fitted outside the lower portion 105b of the cyclonic separator and defines a water collection chamber 114. The water outlet 103 is in fluid communication with the water collection chamber 114.

The wall 105c and cap 105d are each formed by a permeation layer 122 (formed by a water-permeable material) which is sandwiched between a pair of porous honeycomb support structures 120. The wall 105a has a solid structure which is not permeable to water.

The cyclonic separator operates in a similar manner to the cyclonic separator 1 described above. That is, liquid passing through the inlet 102 is introduced tangentially into the separation chamber 119 and flows downwardly in a spiral path. Denser materials suspended in the liquid will move to the outermost circumference within the cross sectional area of the separation chamber 119, leaving less dense material in the core of the spiral flow. The less dense material is discharged from the fuel outlet 104.

The water-permeable material of the permeation layer 122 enables water to flow through it into the water collection chamber 114 via the pores in the support structures 120. The water is then discharged from the water collection chamber via the water outlet 103. The water-permeable material of the permeation layer 122 substantially prevents liquid fuel, ice or particulate material from flowing into the water collection chamber 114. As with the previous embodiment, the water-permeable material may comprise graphene oxide (typically a layered structure of graphene oxide crystallites), a structure with an array of nanoholes, an array of vertically aligned hollow nanotubes such as carbon nanotubes, or any other suitable material which enables water to flow through it but substantially prevents liquid fuel, ice or particulate material from doing so.

Ice and particulate material will collect in the lower portion 105b of the cyclonic separator. When the ice melts, then it will flow through the water permeable material into the water collection chamber 114 and out of the water outlet 103. The particulate material can be removed periodically by separating the cap 105d from the wall 105c as shown in FIG. 12 and flushing the particulate material out of the chamber 114. The wall 105c is fitted with a sealing ring 118 which forms a seal with the cap 105d. The cap 105d may be moved manually, or carried on an actuator (not shown) which is lowered and raised to move the cap 105d between its closed position (FIG. 11) and its open position (FIG. 12).

Figure 13:
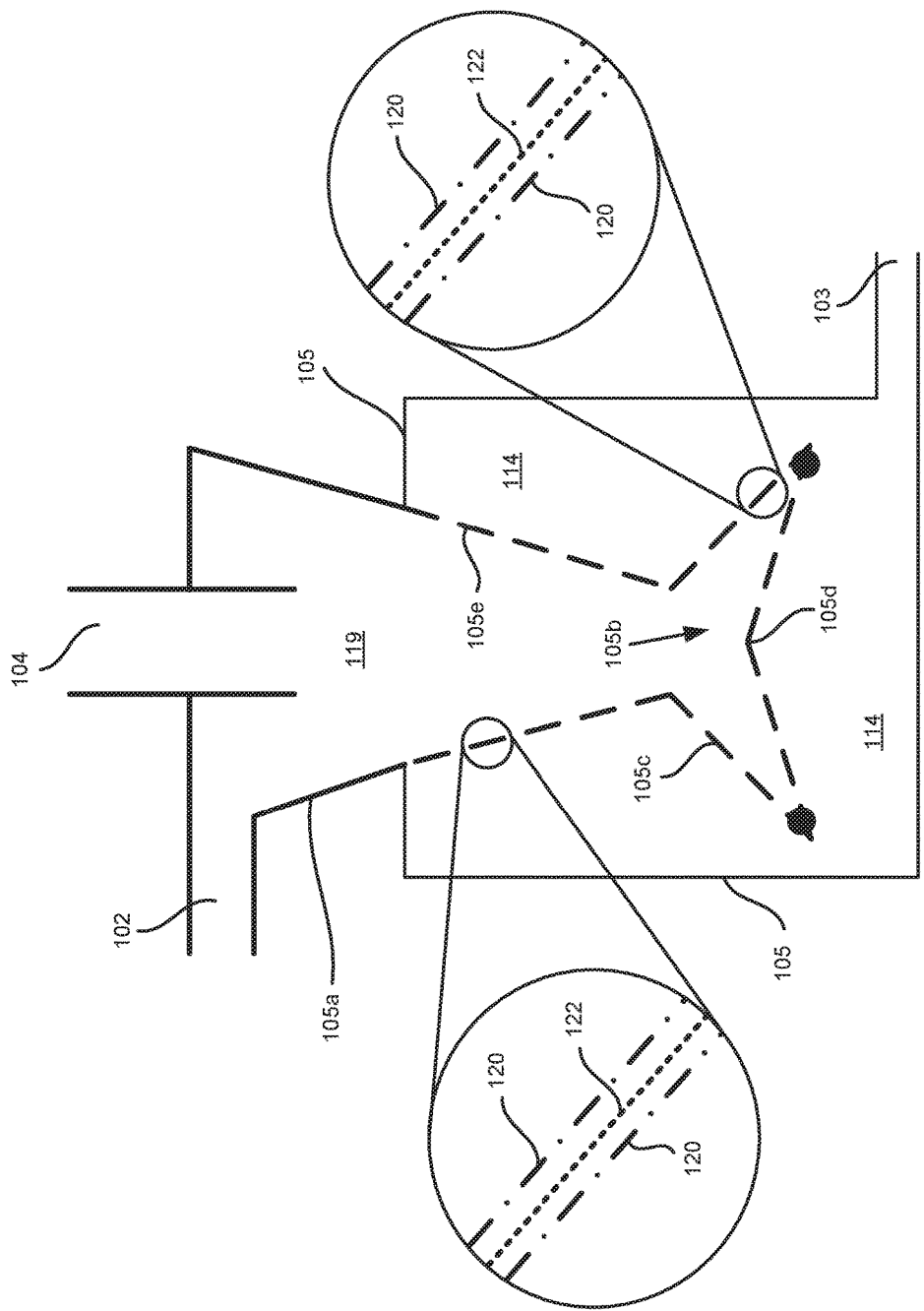
FIG. 13 is a side view of a cyclonic separator according to a further embodiment of the invention.

FIG. 13 shows an alternative embodiment which is identical to the embodiment of FIGS. 10-12, except that the cylindrical water collection housing 105 extends further up the separator, and the lower part of the separation chamber 119 is defined by a water-permeable wall 105e with a downwardly narrowing, frusto-conical shape.

Although the invention has been described above with reference to one or more preferred embodiments, it will be appreciated that various changes or modifications may be made without departing from the scope of the invention as defined in the appended claims.

The invention claimed is:

1. An aircraft fuel system comprising: a fuel tank; and a cyclonic separator comprising: a separation chamber; an inlet in fluid communication with the fuel tank and the separation chamber; a fuel outlet in fluid communication with the separation chamber; and a water outlet, wherein the cyclonic separator, inlet and outlet are shaped and configured to cyclonically separate a tangentially directed fuel-water mixture so as to discharge water from the water outlet and relatively less dense liquid fuel from the fuel outlet, and wherein the cyclonic separator is defined at least in part by a permeation member formed from a water-permeable material which enables water in the separation chamber to flow through the water-permeable material and out of the water outlet, but substantially prevents liquid fuel in the separation chamber from doing so.

2. The aircraft fuel system of claim 1 comprising a wall which defines the separation chamber, wherein the wall symmetrically extends around a centrally disposed, longitudinal axis; wherein the permeation member forms at least part of the wall; and the permeation member also symmetrically extends around the centrally disposed, longitudinal axis.

3. The aircraft fuel system of claim 1 wherein the water-permeable material comprises graphene oxide.

4. The aircraft fuel system of claim 1 further comprising a porous support structure which supports the permeation member, wherein the porous support structure has pores which enables water in the separation chamber to flow through the pores and out of the water outlet.

5. The aircraft fuel system of claim 1 further comprising an engine feed system arranged to feed liquid fuel from the fuel tank into an engine, wherein the water outlet of the cyclonic separator is in fluid communication with the engine feed system.

6. The aircraft fuel system of claim 1, wherein the fuel outlet of the cyclonic separator is in fluid communication with the fuel tank.

7. The aircraft fuel system of claim 1, wherein the liquid fuel is less dense than water.

8. The aircraft fuel system of claim 1, wherein a cross sectional area of the separation chamber decreases toward a bottom of the separator.

9. The aircraft fuel system of claim 1, wherein the inlet of the cyclonic separator is connected to a fuel feed line adapted to entrain a mixture of fuel and water or ice from a region of the fuel tank in which water or ice tends to collect.

10. The aircraft fuel system of claim 1, wherein the inlet of the cyclonic separator is connected to a fuel feed line adapted to entrain a mixture of fuel and water or ice from a sump of the fuel tank.

11. An aircraft including the aircraft fuel system of claim 1.

12. An aircraft fuel system comprising: a fuel tank; and a cyclonic separator comprising: a separation chamber; an inlet in fluid communication with the fuel tank and the separation chamber; a fuel outlet in fluid communication with the separation chamber; and a water outlet, wherein the cyclonic separator is adapted to discharge water from the water outlet and relatively less dense liquid fuel from the fuel outlet, and wherein the cyclonic separator further comprises a permeation member formed from a water-permeable material, wherein the separation chamber is defined by an inner wall comprising the permeation member; the cyclonic separator further comprises an outer wall which surrounds the inner wall, and a cavity between the inner wall and the outer wall; and the water outlet is in fluid communication with the cavity, wherein the cyclonic separator is adapted to discharge water from the water outlet via the cavity and relatively less dense liquid fuel from the fuel outlet, and the permeation member enables water in the separation chamber to flow through the water-permeable material into the cavity, but substantially prevents liquid fuel in the cyclonic separator from doing so.

13. The aircraft fuel system of claim 12, wherein an inner surface of the outer wall includes a hydrophobic coating.

14. The aircraft fuel system of claim 12 wherein the inner wall, the outer wall, and the cavity each have a portion with a frusto-conical shape.

15. A fuel system comprising: a fuel tank; an engine feed system arranged to feed liquid fuel from the fuel tank into an engine; and a cyclonic separator comprising: a separation chamber; an inlet in fluid communication with the fuel tank and the separation chamber; a fuel outlet in fluid communication with the separation chamber; and a water outlet, wherein the cyclonic separator inlet and outlet are shaped and configured to cyclonically separate a tangentially directed fuel-water mixture so as to discharge water from the water outlet and relatively less dense liquid fuel from the fuel outlet, and wherein the cyclonic separator is defined at least in part by a permeation member formed from a water-permeable material which enables water in the separation chamber to flow through the water-permeable material and out of the water outlet, but substantially prevents liquid fuel in the separation chamber from doing so, wherein the water outlet of the cyclonic separator is in fluid communication with the engine feed system.

16. The fuel system of claim 15 wherein the water outlet of the cyclonic separator is in fluid communication with the engine feed system via a discharge line, and the discharge line has an outlet positioned adjacent an inlet of the engine feed system.

17. The fuel system of claim 15 wherein the water outlet of the cyclonic separator is in fluid communication with the engine feed system so that the water discharged from the water outlet of the cyclonic separator flows directly into the engine feed system.

18. The fuel system of claim 15, wherein the water-permeable material comprises graphene oxide.

19. A cyclonic separator comprising: a separation chamber; an inlet in fluid communication with the separation chamber; a fuel outlet in fluid communication with the separation chamber; and a water outlet, wherein the cyclonic separator inlet and outlet are shaped and configured to cyclonically separate a tangentially directed fuel-water mixture so as to discharge water from the water outlet and relatively less dense liquid fuel from the fuel outlet, and wherein the cyclonic separator is defined at least in part by a permeation member formed from a water-permeable material which enables water in the separation chamber to flow through the water-permeable material and out of the water outlet, but substantially prevents liquid fuel in the separation chamber from doing so, wherein the water-permeable material comprises graphene oxide.

20. The cyclonic separator of claim 19, wherein the water-permeable material comprises a layered structure of graphene oxide crystallites.

* * * * *